(12) United States Patent
Gunn et al.

(10) Patent No.: US 10,381,010 B2
(45) Date of Patent: *Aug. 13, 2019

(54) VOICE CONTROL USER INTERFACE DURING LOW POWER MODE

(71) Applicant: Google Technology Holdings LLC, Mountain View, CA (US)

(72) Inventors: Michael E. Gunn, Barkington, IL (US); Pratik M. Kamdar, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 15/281,843

(22) Filed: Sep. 30, 2016

(65) Prior Publication Data

US 2017/0018275 A1     Jan. 19, 2017

Related U.S. Application Data

(63) Continuation of application No. 14/197,633, filed on Mar. 5, 2014, and a continuation-in-part of
(Continued)

(51) Int. Cl.
*G06F 3/16* (2006.01)
*G10L 15/08* (2006.01)
(Continued)

(52) U.S. Cl.
CPC ............ *G10L 17/24* (2013.01); *G06F 1/3206* (2013.01); *G06F 1/3234* (2013.01);
(Continued)

(58) Field of Classification Search
CPC ......... G10L 17/22; G10L 15/08; G10L 15/22; G10L 2015/088; G10L 2015/223;
(Continued)

(56) References Cited

U.S. PATENT DOCUMENTS 5,621,859 A    4/1997   Schwartz et al.
5,679,001 A    10/1997  Russell et al.
(Continued)

OTHER PUBLICATIONS

"Embedded Speech Technologies for Consumer Electronics," Sensory, Inc., downloaded from the Internet on Sep. 12, 2012, http://www.sensoryinc.com/, 2 pages.
(Continued)

*Primary Examiner* — Walter Yehl
(74) *Attorney, Agent, or Firm* — Honigman LLP; Brett A. Krueger

(57) ABSTRACT

A method include placing a first processor in a sleep operating mode and running a second processor that is operative to wake the first processor from the sleep operating mode in response to a speech command phrase. The method includes identifying, by the second processor, a speech command phrase segment and performing a control operation in response to detecting the segment in detected speech. The control operation is performed while the first processor is maintained in the sleep operating mode.

18 Claims, 7 Drawing Sheets

Related U.S. Application Data application No. 13/830,452, filed on Mar. 14, 2013, now Pat. No. 9,152,211, said application No. 14/197,633 is a continuation-in-part of application No. 14/142,177, filed on Dec. 27, 2013, now abandoned, said application No. 14/197,633 is a continuation-in-part of application No. 14/142,210, filed on Dec. 27, 2013, now Pat. No. 9,691,377.

(60) Provisional application No. 61/922,621, filed on Dec. 31, 2013, provisional application No. 61/757,690, filed on Jan. 28, 2013, provisional application No. 61/736,536, filed on Dec. 12, 2012, provisional application No. 61/720,322, filed on Oct. 30, 2012, provisional application No. 61/860,725, filed on Jul. 31, 2013, provisional application No. 61/827,723, filed on May 27, 2013, provisional application No. 61/798,097, filed on Mar. 15, 2013, provisional application No. 61/776,793, filed on Mar. 12, 2013, provisional application No. 61/892,527, filed on Oct. 18, 2013, provisional application No. 61/857,696, filed on Jul. 23, 2013, provisional application No. 61/878,295, filed on Sep. 16, 2013.

(51) Int. Cl.
*G10L 17/24* (2013.01)
*G06F 1/3234* (2019.01)
*G10L 15/22* (2006.01)
*G06F 1/3206* (2019.01)
*G06F 1/3287* (2019.01)
*G06F 1/16* (2006.01)
*G09G 5/393* (2006.01)
*G06F 3/0482* (2013.01)
*G06F 3/0488* (2013.01)

(52) U.S. Cl.
CPC .......... *G06F 1/3265* (2013.01); *G06F 1/3287* (2013.01); *G06F 3/167* (2013.01); *G10L 15/08* (2013.01); *G10L 15/22* (2013.01); *G06F 1/1626* (2013.01); *G06F 3/0482* (2013.01); *G06F 3/0488* (2013.01); *G09G 5/393* (2013.01); *G09G 2330/021* (2013.01); *G09G 2360/18* (2013.01); *G10L 2015/088* (2013.01); *G10L 2015/223* (2013.01); *G10L 2015/225* (2013.01); *Y02D 50/20* (2018.01)

(58) Field of Classification Search
CPC .... G06F 1/3206; G06F 1/3234; G06F 1/3265; G06F 1/3287; G06F 3/0482; G06F 3/0488; G06F 3/1626; G06F 3/167; Y02D 50/20; G09G 5/393; G09G 2330/021; G09G 2360/18
See application file for complete search history.

(56) References Cited

U.S. PATENT DOCUMENTS

| | | | |
|---|---|---|---|
| 5,995,930 A | 11/1999 | Hab-Umbach et al. | |
| 6,307,548 B1 | 10/2001 | Flinchem et al. | |
| 6,346,892 B1 | 2/2002 | DeMers | |
| 6,397,186 B1* | 5/2002 | Bush | G06F 3/167 704/274 |
| 6,567,787 B1* | 5/2003 | Walker | G06Q 10/06398 705/16 |
| 7,099,829 B2* | 8/2006 | Gomez | G10L 15/22 704/270 |
| 7,809,553 B2 | 10/2010 | Fux | |
| 7,826,945 B2 | 11/2010 | Zhang et al. | |
| 8,224,650 B2 | 7/2012 | Galanes | |
| 8,554,560 B2 | 10/2013 | Valsan | |
| 8,768,712 B1* | 7/2014 | Sharifi | G10L 15/08 704/275 |
| 8,949,902 B1* | 2/2015 | Fabian-Isaacs | H04N 21/439 725/52 |
| 9,921,803 B2* | 3/2018 | Savolainen | G10L 17/26 |
| 2002/0013701 A1 | 1/2002 | Oliver et al. | |
| 2002/0031086 A1 | 3/2002 | Welin | |
| 2002/0046032 A1 | 4/2002 | Wutte | |
| 2002/0128827 A1 | 9/2002 | Bu et al. | |
| 2003/0220798 A1* | 11/2003 | Schmid | G10L 15/28 704/276 |
| 2004/0058647 A1 | 3/2004 | Zhang | |
| 2004/0085297 A1* | 5/2004 | Stivers | G09G 5/006 345/168 |
| 2004/0220809 A1 | 11/2004 | Wang et al. | |
| 2004/0236574 A1 | 11/2004 | Ativanichayaphong | |
| 2005/0075069 A1* | 4/2005 | Higuchi | H04M 1/72522 455/3.05 |
| 2005/0159950 A1 | 7/2005 | Roth et al. | |
| 2005/0282588 A1* | 12/2005 | Linjama | G06K 7/10207 455/566 |
| 2006/0095451 A1* | 5/2006 | Dvorak | H04N 1/00127 |
| 2007/0100635 A1* | 5/2007 | Mahajan | G10L 15/22 704/276 |
| 2007/0135187 A1* | 6/2007 | Kreiner | H04M 1/271 455/575.2 |
| 2007/0150288 A1* | 6/2007 | Wang | G10L 15/22 704/275 |
| 2007/0288129 A1 | 12/2007 | Komer et al. | |
| 2008/0059186 A1* | 3/2008 | Mowatt | G10L 15/193 704/257 |
| 2009/0204409 A1 | 8/2009 | Mozer et al. | |
| 2009/0299741 A1 | 12/2009 | Chittar et al. | |
| 2010/0180202 A1* | 7/2010 | Del Valle Lopez | G06F 3/048 715/728 |
| 2011/0102161 A1 | 5/2011 | Heubel et al. | |
| 2011/0125503 A1* | 5/2011 | Dong | G10L 15/22 704/275 |
| 2011/0276323 A1* | 11/2011 | Seyfetdinov | G06F 21/32 704/207 |
| 2011/0313768 A1* | 12/2011 | Klein | G06F 3/017 704/251 |
| 2012/0245941 A1* | 9/2012 | Cheyer | G06F 21/32 704/246 |
| 2012/0271633 A1 | 10/2012 | Yoshida et al. | |
| 2013/0289994 A1* | 10/2013 | Newman | G10L 15/22 704/254 |
| 2013/0325484 A1* | 12/2013 | Chakladar | G06F 3/167 704/275 |
| 2013/0325485 A1 | 12/2013 | Chittar et al. | |
| 2014/0122087 A1* | 5/2014 | Macho | G10L 17/22 704/275 |
| 2014/0122911 A1* | 5/2014 | Gunn | G06F 3/0488 713/323 |
| 2014/0142953 A1* | 5/2014 | Kim | G10L 15/22 704/275 |
| 2014/0163978 A1* | 6/2014 | Basye | G10L 15/28 704/233 |
| 2014/0195247 A1* | 7/2014 | Parkinson | G10L 21/06 704/275 |
| 2014/0222436 A1* | 8/2014 | Binder | G06F 3/167 704/275 |
| 2014/0244269 A1* | 8/2014 | Tokutake | G10L 15/00 704/275 |
| 2014/0278435 A1* | 9/2014 | Ganong, III | G10L 15/22 704/275 |
| 2014/0365885 A1* | 12/2014 | Carson | G06F 3/167 715/708 |
| 2015/0340040 A1* | 11/2015 | Mun | G10L 17/22 704/246 |
| 2016/0148610 A1* | 5/2016 | Kennewick, Jr. | G10L 15/18 704/240 |
| 2016/0253997 A1* | 9/2016 | Kerr | G10L 15/28 381/110 |

(56) References Cited

U.S. PATENT DOCUMENTS

| | | | | |
|---|---|---|---|---|
| 2016/0379635 A1* | 12/2016 | Page | ...................... | G10L 15/22 704/251 |
| 2017/0206901 A1* | 7/2017 | Gunn | ...................... | G10L 15/22 |
| 2017/0213553 A1 | 7/2017 | Gunn | | |

OTHER PUBLICATIONS

"Speech Recognition," Speech Recognition | Neuro AI, downloaded from the internet on Sep. 16, 2003, http://www.learnartificialneuralnetworks.com/speechrecognition.html, 9 pages.
"Spoken Keyword Spotting Benchmark," Keyword Spotting, downloaded from the internet on Sep. 12, 2013, http://ttic.uchicago.edu/~jkeshet/Keyword_Spotting.html, 2 pages.
Akbacak, Murat et al., "Rich System Combination for Keyword Spotting in Noisy and Acoustically Herterogeneous Audion Streams," In Proceedings IEEE ICASSP (Vancouver, BC), May 2013, 5 pages.
Benayed, Y. et al., "Confidence Measures for Keyword Spotting Using Support Vector Machines," IEEE International Conference on Acoustics, Speech, and Signal Processing, Apr. 2003, 4 pages.
Brindle, J.S., "An Efficient Elastic-Template Method for Detecting Given Words in Running Speech," British Acoustical Society, Spring Meeting, Apr. 1973, 5 pages.
Dahl, G.E. et al., "A Context-Dependent Pre-Trained Deep Neural Networks for Large-Vocabulary Speech Recognition," IEEE Transactions on Audio, Speech, and Language Processing, vol. 20, No. 1, Jan. 2013, 13 pages.
Fernandez, Santiago et al., "An Application of Recurrent Neural Networks to Discriminative Keyword Spotting," ICANN 2007, 10 pages.
Grangier, David et al., "Discriminative Keyword Spotting", Automatic Speech and Speaker Recognition: Large Margin and Kernel Methods, Wiley, 2009, 23 pages.
Higgins, Alan et al., "Keyword Recognition Using Template Concatenation," IEEE International Conference on Acoustics, Speech, and Signal Processing, Apr. 1985, ICASSP-85, 4 pages.
Hinton, G. et al., "Deep Neural Networks for Acoustic Modeling in Speech Recognition: The Shared Views of Four Research Groups," Signal Processing Magazine, IEEE, vol. 29, No. 6, Nov. 2012, 16 pages.
Keshet, Joseph et al., "Discriminative Keyword Spotting," Speech Communication, vol. 51, No. 4, Apr. 30, 2009, 27 pages.
Ling, Yong, "Keyword Spotting in Continuous Speech Utterances," School of Computer Science, McGill University, Montreal, A Thesis submitted to the Faculty of Graduate Studies and Research in partial fulfillment of the requirements for the degree of Master of Science, Feb. 1, 1999, 80 pages.
Rose, Richard C. et al., "A Hidden Markov Model Based Keyword Recognition System," IEEE International Conference on Acoustics, Speech, and Signal Processing, Apr. 1990, ICASSP-90, 4 pages.
Sandness, Eric D. et al., "Keyword-Based Discriminative Training of Acoustic Models," $6^{th}$ International Conference on Spoken Language Processing, ICSLP 2000/INTERSPEECH 2000, Oct. 2000, 4 pages.
Sukkart, Rafid A. et al., "Utterance Verification of Keyword Strings Using Word-Based Minimum Verification Error (WB-MVE) Training," 1996 IEEE, 4 pages.
Szöke, Igor et al., "Comparison of Keyword Spotting Approaches for Informal Continuous Speech," Interspeech 2005, 4 pages.
Tatibian et al., "Performance Evaluation for an HMM-Based Keyword Spotter and a Large-Margin Based One in Noisy Environments," WCIT 2010, 5 pages.
Tebelskis, Joe, "Speech Recognition Using Neural Networks," School of Computer Science, Carnegie Mellon University, Submitted in partial fulfillment of the requirements for a degree of Doctor of Philosophy in Computer Science, 1995, 190 pages.
Thambiratnam, K. et al., "Fusion of Cohort-Word and Speech Background Model Based Confidence Scores for Improved Keyword Confidence Scoring and Verification," SETIT 2005, 5 pages.
Weintraub, Mitchel et al., "Neural-Network Based Measures of Confidence for Word Recognition," IEEE International Conference on Acoustics, Speech, and Signal Processing, 1997, ICASSP-97, Apr. 1997, 4 pages.
Weintraub, Mitchel, Improved Keyword-Spoiling Using SRI's Decipher™ Large-Vocabularly Speech-Recognition System, 1993, 5 pages.
Weintraub, Mitchel, Keyword-Spotting Using SRI's Decipher™ Large-Vocabulary Speech-Recognition System, ICASSP 1993, 4 pages.
Weintraub, Mitchel, "LVCSR Log-Likelihood Ratio Scoring for Keyword Spotting," ICASSP 1995, 4 pages.

* cited by examiner

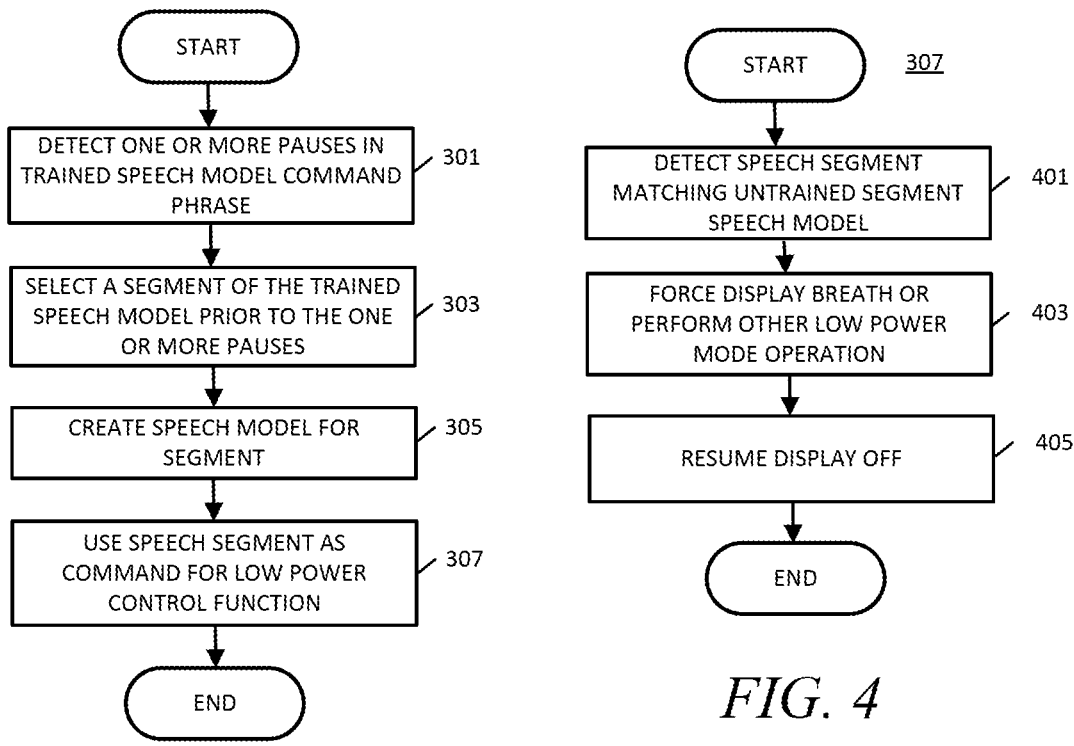
FIG. 3
FIG. 4
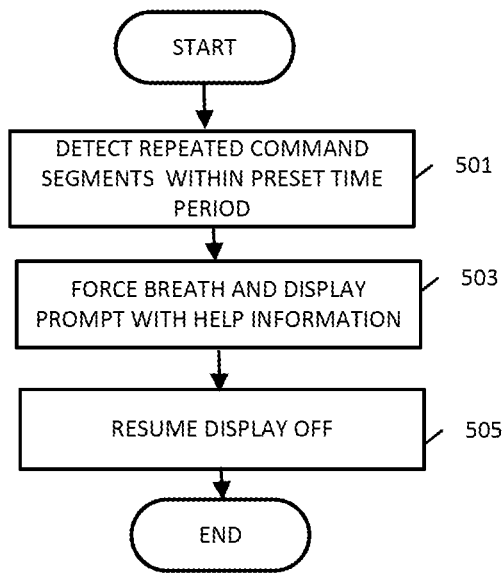
FIG. 5

VOICE CONTROL USER INTERFACE DURING LOW POWER MODE

CROSS-REFERENCE TO RELATED APPLICATIONS

The present application is a continuation of U.S. application Ser. No. 14/197,633, filed Mar. 5, 2014, which claims the benefit of U.S. Provisional Application No. 61/922,621, filed Dec. 31, 2013.

U.S. application Ser. No. 14/197,633 is a continuation-in-part of U.S. application Ser. No. 13/830,452, filed Mar. 14, 2013, which claims the benefit of U.S. Provisional Application No. 61/757,690 filed Jan. 28, 2013; U.S. Provisional Application No. 61/736,536 filed Dec. 12, 2012; and U.S. Provisional Application No. 61/720,322 filed Oct. 30, 2012.

U.S. application Ser. No. 14/197,633 is a continuation-in-part of U.S. application Ser. No. 14/142,177, filed Dec. 27, 2013, which claims the benefit of U.S. Provisional Application No. 61/860,725 filed Jul. 31, 2013; U.S. Provisional Application No. 61/827,723 filed May 27, 2013; U.S. Provisional Application No. 61/798,097 filed Mar. 15, 2013; and U.S. Provisional Application No. 61/776,793 filed Mar. 12, 2013.

U.S. application Ser. No. 14/197,633 is a continuation-in-part of U.S. application Ser. No. 14/142,210, filed Dec. 27, 2013, which claims the benefit of U.S. Provisional Application No. 61/892,527 filed Oct. 18, 2013; and U.S. Provisional Application No. 61/857,696 filed Jul. 23, 2013.

U.S. application Ser. No. 14/197,633 claims the benefit of U.S. Provisional Application No. 61/878,295, filed Sep. 16, 2013.

U.S. application Ser. No. 14/197,633 claims the benefit of U.S. Provisional Application No. 61/860,725, filed Jul. 31, 2013.

The contents of each of these applications are hereby incorporated by reference in their entirety.

FIELD OF THE DISCLOSURE

The present disclosure relates generally to voice recognition systems and more particularly to user interfaces that include voice recognition.

BACKGROUND

Many existing communication devices (also referred to as mobile devices) include a means of notifying a user that an event occurred with respect to the mobile device. Such an event may be a missed phone call, incoming email message or incoming text message, etc. One example means that has been used to inform a user of such notifications is a light emitting diode (LED). The LED may blink occasionally to alert the user to state changes of the mobile device, such as when an email or text message has been received, or when a telephone call has been missed, where the state change results in a notification. In some mobile devices, the LED may blink even when the mobile device display is in a power save mode or when the mobile device is in a sleep mode of operation.

When the mobile device is awake, and therefore not in a sleep mode of operation, the user may observe such notifications directly on the mobile device display by way of visual indications such as textual notifications, icons or by other graphic images that provide additional information regarding the specific type of notification. In another example of visual indications, most mobile devices will display at least a clock showing the time of day and a battery charge level. If the mobile device is in a sleep mode and the display is turned off, the user must wake the mobile device in order to turn the display on again to view the visual indications such as the time of day, or to access information about specific notifications. For control systems employing voice control, viewing visual indications related to notifications may require waking the mobile device, more particularly waking a main processor, in order to implement desired functionality.

BRIEF DESCRIPTION OF THE DRAWINGS

FIG. 3 is a flowchart of an example method for generating a speech model in accordance with an embodiment.

FIG. 4 is a flowchart of an example method for performing a low power mode operation in accordance with an embodiment.

FIG. 5 is a flowchart of an example method for revealing help information to a user in accordance with an embodiment.

DETAILED DESCRIPTION

Figure 1:
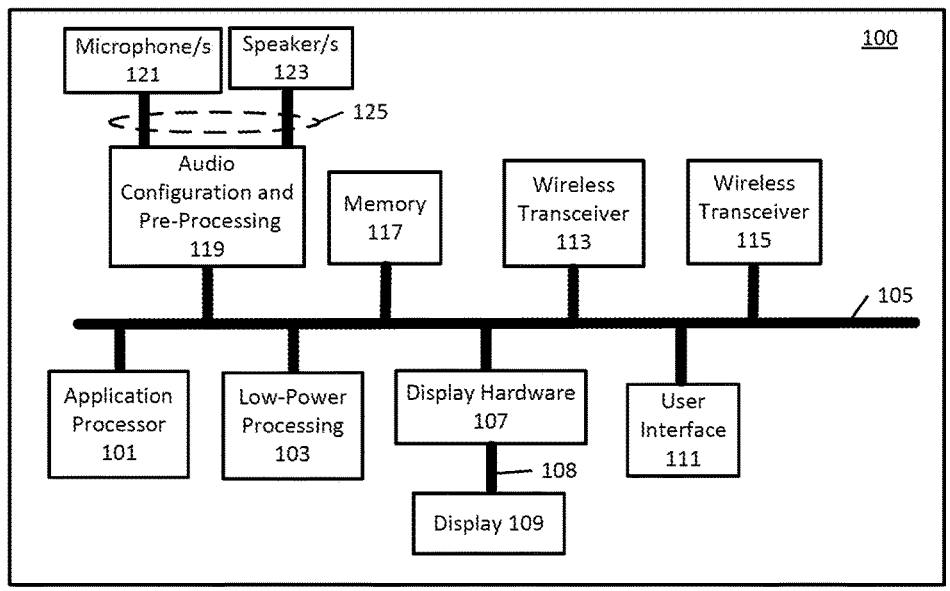
FIG. 1 is a block diagram of a mobile device in accordance with the embodiments.

Briefly, the present disclosure provides apparatuses and methods for a voice control user interface with progressive command engagement. In accordance with the embodiments, a voice command phrase may be broken down or decomposed into speech command phrase segments which represent a portion of the voice command phrase. The speech command phrase segments are then utilized, in accordance with the embodiments, to enable a first type of user interaction with an apparatus that may, for example, occur during a low-power state. The user may speak additional speech command phrase segments to engage in other user interactions of the first type, or may speak the entire voice command phrase to engage in a user interaction of a second type. That is, speaking speech command phrase segments initially and then subsequently speaking an entire command phrase progressively activates additional capabilities of the apparatus progressing from user interactions of the first type to user interactions of the second type. For example, a speech command phrase segment may allow the user to access features during a low-power state (i.e. user interactions of a first type), while the full voice command phrase may access features that require waking an application processor (i.e. user interactions of a second type). The voice control user interface thereby provides the user with progressive command engagement.

The present disclosure provides, among other things, a method of operation that begins with operating a first processor in a sleep mode and operating a second processor that is operative to wake the first processor from the sleep mode in response to a speech command phrase. The method includes identifying, by a speech recognition engine, a speech command phrase segment and performing, by the second processor, a control operation in response to the segment. Performing a control operation by the second processor in response to the segment may include performing the control operation without waking the first processor from the sleep mode. Also, performing a control operation by the second processor in response to the segment may include performing the control operation prior to waking the first processor from the sleep mode, and also waking the first processor from the sleep mode. Performing the control operation without waking the first processor from the sleep mode may include providing output information in response to the segment.

In some embodiments, providing output information in response to the segment may include updating a portion of display data maintained in a frame buffer, where the display data corresponds to a most recently displayed image, and displaying the updated display data on a display. In such embodiments, the method may further include activating at least a portion of the display prior to displaying the updated display data, where the activated portion of the display corresponds to a portion of the most recently displayed image that is updated according to the updated display data.

In some embodiments, displaying the updated display data on a display may include displaying the updated display data on the display for a predetermined period of time, and turning the display off after the predetermined period of time has expired. Also in some embodiments, providing output information in response to the segment may include producing an audible response or a mechanical movement as the output information.

The present disclosure also provides an apparatus operative to perform various methods of operation disclosed herein. One example apparatus may include a first processor having a sleep operating mode, a speech recognition engine operative to identify a speech command phrase segment while the first processor is operated in the sleep operating mode, and a control system operatively coupled to the first processor. The control system is operative to control equipment in response to the speech command phrase segment, while the first processor operates in the sleep operating mode. A second processor is operatively coupled to the first processor, to the speech recognition engine and to the control system. The second processor is operative to wake the first processor from the sleep operating mode in response to a speech command phrase, and to send control command data to the control system also in response to the speech command phrase segment.

In some embodiments, the apparatus may also include a basic speech model and a segment speech model. The speech recognition engine is operative to utilize the segment speech model to identify the speech command phrase segment when the first processor operates in the sleep operating mode. In some embodiments, the second processor is also operative to send control command data to the control system, in response to the speech command phrase segment, without waking the first processor from the sleep mode.

In another embodiment, an apparatus includes a first processor having a sleep operating mode, a speech recognition engine operative to identify a speech command phrase segment while the first processor is operated in the sleep operating mode, display hardware and a display. The display hardware is operatively coupled to the first processor and is operative to store display data in a frame buffer for a most recently displayed image while the display is turned off. A second processor is operatively coupled to the first processor, to the speech recognition engine, and to the display hardware. The second processor is operative to wake the first processor from the sleep operating mode in response to a speech command phrase, and to update a portion of the display data in the frame buffer in response to the speech command phrase segment. The second processor is also operative to turn at least a portion of the display on for a period of time to display the updated portion of the display data, and to turn the display off again after expiration of the period of time.

The apparatus of may also include a basic speech model and a segment speech model. The speech recognition engine is operative to utilize the segment speech model to identify the speech command phrase segment when the first processor operates in the sleep operating mode. The second processor and the display hardware are also operative to activate at least a portion of the display prior to displaying the updated display data. More particularly, the activated portion of the display corresponds to a portion of the most recently display image that is updated according to the updated display data.

Turning now to the drawings, a block diagram of an example apparatus of an embodiment, a mobile device 100, is provided in FIG. 1. One or more internal connection buses 105 provide operative coupling between an application processor 101, low-power processing 103 and other various mobile device 100 components. As used herein, components may be "operatively coupled" when information can be sent between such components, even though there may be one or more intermediate or intervening components between, or along the connection path. Therefore, any of the various components connected to the one or more connection buses 105 may be understood herein to be operatively coupled to the application processor 101, to the low-power processing 103, or some other component, etc. where appropriate.

The memory 117 is a non-volatile, non-transitory memory, and stores executable instructions (executable code) or data that may be accessed and executed by the application processor 101 or the low-power processing 103. The mobile device 100 includes one or more microphones 121 (such as a microphone array) and one or more speakers 123 that are operatively coupled by connections 125 to audio configuration and pre-processing logic 119. The audio configuration and pre-processing logic 119 may include analog-to-digital converters (ADCs), digital-to-analog converters (DACs), echo cancellation, high-pass filters, low-pass filters, band-pass filters, adjustable band filters, noise reduction filtering, automatic gain control (AGC) and other audio processing that may be applied to filter noise from audio received using the one or more microphones 121. The audio configuration and pre-processing logic 119 may be a single component as shown in FIG. 1 or may be implemented partly in hardware and partly in software or firmware executed by application processor 101 or by low-power processing 103. In some embodiments, the audio configuration and pre-processing logic 119 may be implemented using several hardware components and may also utilize one or more software or firmware components in various combinations. The audio configuration and pre-processing logic 119 may be operative to control the one or more microphones 121 to turn certain microphones on or off or to adjust filtering or gain for purposes of various applications.

A first wireless transceiver 113 may provide wireless communication capabilities for one or more wide area network communications systems such as, but not limited to, cellular, 2G, 3G or 4G wireless communications systems and may also provide Internet connectivity over a wireless interface. In some embodiments, a second wireless transceiver 115 may also be present in the mobile device 100. The second wireless transceiver 115 may provide wireless connectivity capabilities such as, but not limited to, Wi-Fi™ Bluetooth™, Wireless USB™, ZigBee™, or other technologies, etc., and may also provide Internet connectivity over any of these wireless interfaces.

The user interface 111 may include voice control, a track ball mouse, touch sensitive elements, physical switches, gyroscopic position sensors, etc. The user interface 111 may provide command and control signals to the application processor 101 or to the low-power processing 103 during various modes of operation of the mobile device 100. A display 109 may provide a touchscreen capability as part of the user interface 111, and may also provide a graphical user interface (GUI) related to a mobile device operating system, a GUI related to one or more mobile device applications, etc. The display 109 is coupled to display hardware 107 by display bus 108 and the display hardware 107 is operatively coupled to the application processor 101 and to the low-power processing 103 by the one or more connection buses 105. The display hardware 107 is part of a control system that controls the display 109.

Figure 2:
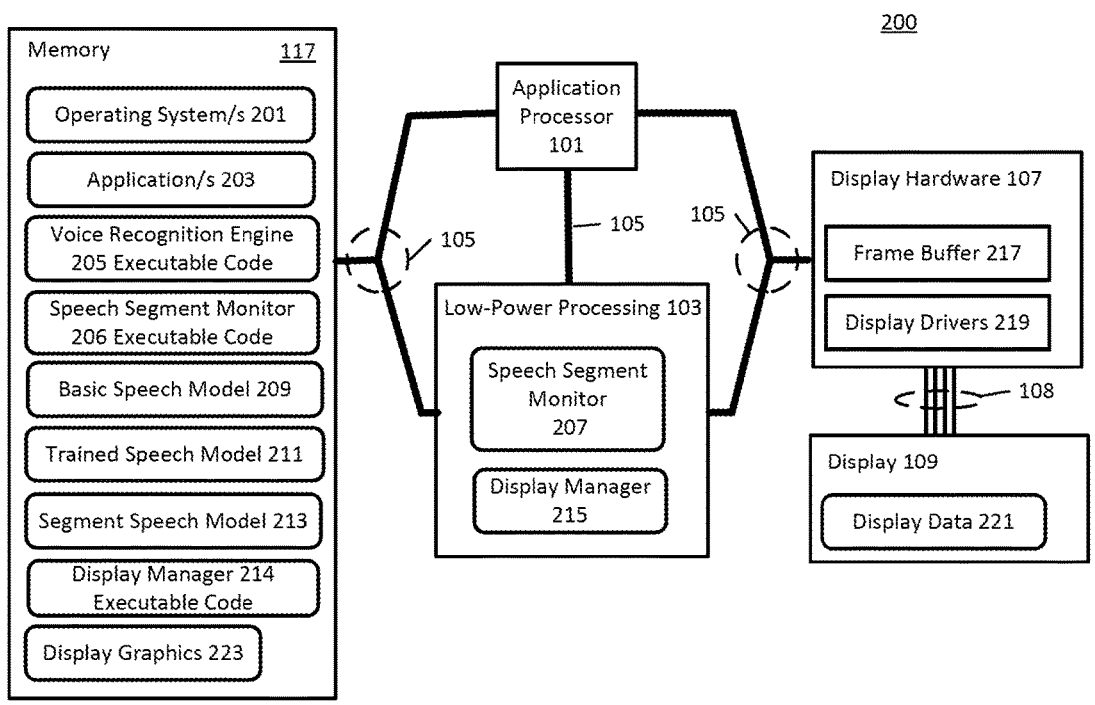
FIG. 2 is a block diagram of another mobile device in accordance with the embodiments.

FIG. 2 is a block diagram of another example apparatus, in another embodiment, which is a mobile device 200. Mobile device 200 includes similar components to the components of mobile device 100, but these other components are omitted from FIG. 2 for clarity. One or more connection buses 105 provide operative coupling between an application processor 101, a low-power processing 103, non-volatile, non-transitory memory 117, and display hardware 107. The display hardware 107 is operatively coupled to a display 109 by a display bus 108. The memory 117 stores executable instructions (also referred to herein as executable code) and data for one or more operating systems 201 and for various applications 203. The memory 117 may also store voice recognition engine 205 executable code and speech segment monitor 206 executable code in accordance with an embodiment. The memory 117 also stores a basic speech model 209, a trained speech model 211 and a segment speech model 213 in some embodiments. These speech models are used by the voice recognition engine 205 and the speech segment monitor 207. The speech segment monitor 207 is itself a voice recognition engine, but may be a reduced version of the voice recognition engine 205 that is suitable for low-power mode operation. In other words, the speech segment monitor 207 does not implement all features of the full voice recognition system implemented by the voice recognition engine 205. The voice recognition engine 205 may be implemented by the application processor 101 executing the executable code stored in memory, or may be implemented using hardwired circuitry such as, but not limited to, an ASIC (application specific integrated circuit) or equivalent.

The memory 117 may also store display manager 214 executable code and display graphics 223. Thus in some embodiments, a display manager may be implemented by a processor executing the display manager 214 executable code. However, in other embodiments, a display manager 215 is implemented using hardwired circuitry such as an ASIC or equivalent. In other embodiments, a display manager may be implemented as a combination of hardware and software. The application processor 101, as well as some processors included in the low-power processing 103, are therefore operative to access the memory 117 to access data or to execute stored executable instructions. The low-power processing 103 is therefore operative to access data and to execute some of the executable instructions stored in memory 117. For example, the low-power processing 103, in accordance with one example embodiment is operative to execute the speech segment monitor 206 executable code and the display manager 214 executable code. In another example embodiment, the speech segment monitor 207 is an ASIC, and the display manager 215 is an ASIC, and neither ASIC requires any additional executable code in order to operate. Regardless of the specific implementation utilized in the various embodiments, the speech segment monitor 207 may access and utilize the basic speech model 209, the trained speech model 211, and the segment speech model 213. The low-power processing 103 may access display graphics 223 and provide portions of the display graphics 223 data to the display hardware 107 over the one or more connection buses 105. In one example embodiment, the display hardware 107 includes a frame buffer 217 and display drivers 219 that store and refresh display data 221 displayed by the display 109.

The memory 117 may also store various libraries (not shown) used to implement various application programming interfaces (APIs). For example an API may enable the voice recognition engine 205 to send voice commands to the various applications 203 or to the one or more operating systems 201. The various applications 203 may include, but are not limited to, web browsers, email programs, instant messaging clients, etc., any of which may communicate with the Internet or other networks. In another example, an API may enable the speech segment monitor 207 to send command and control data to the display manager 215 or to the voice recognition engine 205.

It is to be understood that any of the above described software components (i.e. executable instructions or executable code) or any of the above described components of mobile device 200 may be implemented as software or firmware (or a combination of software and firmware) executing on one or more processors, or using ASICs (application-specific-integrated-circuits), DSPs (digital signal processors), hardwired circuitry (logic circuitry), state machines, FPGAs (field programmable gate arrays) or combinations thereof. Therefore the mobile device 200 illustrated in FIG. 2 is one example of a mobile device and is not to be construed as a limitation on the various other possible mobile device implementations that may be used in accordance with the various embodiments. The low-power processing 103 may be a single component or may be implemented as any combination of DSPs, ASICs, FPGAs, CPUs running executable instructions, hardwired circuitry, state machines, etc., without limitation. Therefore, as already described in one example provided above, the speech segment monitor 207 may be implemented as one ASIC, and the display manager 215 may be implemented as another ASIC that is operatively coupled to the speech segment monitor 207. The speech segment monitor 207 is operatively coupled to the application processor 101 by the one of more connection buses 105, and is operative to provide a "wake-up" signal to the application processor 101 in response to detecting a wake-up voice command phrase received by the one or more microphones 121. The speech segment monitor 207 is also operative to provide a control signal to the display manager 215 in response to detecting a speech command phrase segment. The operation of detecting a speech command phrase segment is described in further detail herein below.

The various embodiments of the present disclosure also include non-volatile, non-transitory computer readable memory, other than memory 117, that may contain executable instructions (i.e. executable code), for execution by at least one processor, that when executed, cause the at least one processor to operate in accordance with the functionality and methods of operation herein described. The computer readable memory may be any suitable non-volatile, non-transitory, memory such as, but not limited to, programmable chips such as EEPROMS, flash ROM (thumb drives), compact discs (CDs) digital video disks (DVDs), etc., that may be used to load executable instructions or program code to other processing devices such as servers, mobile devices or other devices such as those that may benefit from the features of the herein described embodiments. For example, the speech segment monitor 206 executable code, display manager 214 executable code or display graphics 223 may be stored on any of the above described forms of computer readable memory, etc.

In accordance with the embodiments, the mobile device 200 is configured to implement a touchless control feature (i.e. voice control feature) that enables a user to speak a specific trigger phrase, followed by a command, to wake the mobile device 200 (if not already awake) from a sleep mode of operation. In order to conserver battery power, the mobile device 200 may be placed in a sleep mode of operation from time-to-time based on remaining idle for some preset period of time. During sleep mode, the application processor 101 is partially shut down and maintains only those functions necessary for basic system operation. In some embodiments, the low-power processing 103 takes over some operations of the application processor 101 and may execute at least a reduced code version of the voice recognition engine 205 executable code. In other embodiments, the speech segment monitor 207 takes over when the application processor 101 goes into sleep mode, and provides a limited voice recognition capability. The speech segment monitor 207 voice recognition engine listens for voice commands, processes the commands, and returns a user interface action or behavior that is the result of the user's intent. For example, if the user wishes to view visual indications on the display the user may speak a previously trained "wake-up" command phrase to wake the application processor 101 and turn the display 109 on. The low-power processing 103, or more specifically the speech segment monitor 207, then sends a wake command to the application processor 101 over the one or more connection buses 105 to activate the application processor 101 and turn the display back on, etc.

Figure 9A:
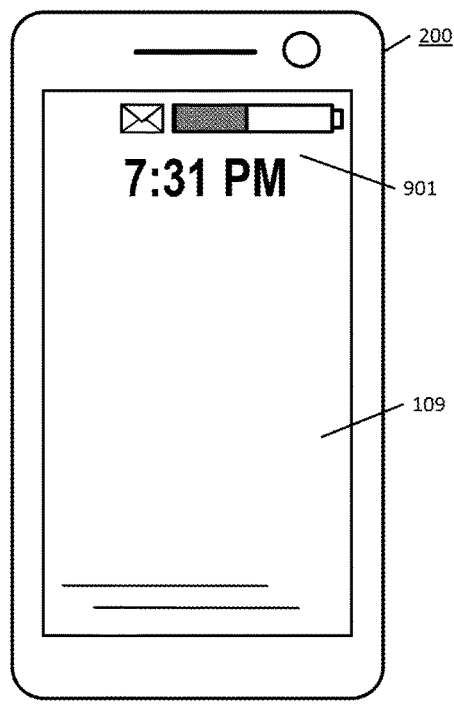
FIGS. 9A through 9D provide examples of display data displayed on a mobile device display in accordance with various embodiments.

However, if the user only wants to see, for example, the time of day, it is not a necessity to wake the application processor 101. The mobile device 200 is therefore also configured to implement "breathing" of the display 109. The breathing process turns the display 109 on occasionally, and then off again, using a reduced frequency clock rate during sleep mode, such that the user may see the display and any new visual indications that may be present. Turning briefly to FIG. 9A, an example of a display "breath" is shown in which the display 109 may be lit up to show only the background (such as a wallpaper) and some visual indications 901. The visual indications 901 are examples and include a clock (i.e. time of day indication), an envelope icon indicating an email or text message received, and a battery level indicator. The battery level indicator may only be displayed when the battery charge is reduced to a certain predetermined level and therefore may not always be present. The envelope icon will only be present if an unread message has been received, etc. Some other icons may also be present such as a "missed call" icon, or an icon for unlocking the mobile device, or some other icon.

Returning to FIG. 2, the low-power processing 103 implements the breathing process by way of the display manager 215. The last graphic image displayed prior to sleep mode, as represented by display data 221, is latched in the frame buffer 217 and displayed on display 109 only during a "breath." The display manager 215 is operative to write to the frame buffer 217 and override portions of the display data 221. In one example, the low-power processing 103 may update the clock (time of day) the battery charge level and notification icons and the display manager 215 may update the appropriate portions of the frame buffer 217. The remainder of the display data 221 remains unchanged while the application processor 101 is in sleep mode. The low-power processing 103, display manager 215, therefore handles the breathing operations and updating of the frame buffer 217 portions. The display graphics 223 is display data that includes the notification icons and other graphics object, such as the envelope shown in FIG. 9A, that may be retrieved by the display manager 215 and sent to the frame buffer 217 to update the display data 221. Put another way, the display manager 215 uses display data stored as display graphics 223, to overwrite portions of the display data 221 that is maintained by the frame buffer 217.

In the embodiments, battery power can be conserved by performing a display breath operation only when desired by the user. Therefore, in accordance with the embodiments, the mobile device 200 is also configured to perform a "forced breath" display operation. More specifically, the various embodiments provide user voice command engagement in varying degrees (i.e. progressive engagement) by using the segment speech model 213. Rather than performing breathing and turning the display on and off on a schedule, a "forced breath" operation turns the display on and off again only in response to a user voice command. Both scheduled breathing operations and forced breathing may be used together in the various embodiments. The forced breath may also occur in response to other interactions with the user interface 111, such as by nudging the mobile device 200 or by touching the touch sensitive display 109. For voice commands, if the display 109 is off and a speech command phrase segment is spoken, the low-power processing 103 will trigger a forced breath immediately, without waking up the application processor 101. For example, the trained speech model 211 may contain a speech command phrase such as "Okay, wake up!" If the speech segment monitor 207 detects this "wake-up speech command phrase," then the speech segment monitor 207 will send a wake-up command to the application processor 101. However, in accordance with the embodiments, the segment speech model 213 may include the word "Okay" as a speech command phrase segment. In that case, the speech segment monitor 207 will send a forced breadth command to the display manager 215 in response to detecting the speech command phrase segment. In addition, if the user speaks the entire speech command phrase such as "Okay, wake up," the speech segment monitor 207 will also send the wake-up command to the application processor 101 to begin the wake-up process. In other words, the forced breadth may occur prior to the application processor 101 being fully awakened. However, if the user only speaks the speech command phrase segment, the speech segment monitor 207 will only send the forced breadth command to the display manager 215 and will not wake the application processor 101. Therefore, the user is provided with output information, as the display data 221 that is displayed on the display 109 for a brief period of time in response to detection of the speech command phrase segment.

Therefore, in accordance with the embodiments, the speech segment monitor 207 and the display manager 215 operate when the mobile device 200 is placed in a low power mode, such as a sleep state, and may wake the mobile device 200 (i.e. by waking the application processor 101) depending on the voice commands detected by the speech segment monitor 207. Example methods of operation that involve the speech segment monitor 207, the display manager 215 and the low-power processing 103 are described below with respect to flowcharts in FIG. 3 through FIG. 8.

FIG. 3 is a flowchart of an example method for generating a speech model in accordance with an embodiment. As is known by those familiar with voice-recognition systems, a user may train a voice recognition system to recognize the user's particular speech pattern. A voice recognition engine may be implemented in some embodiments by the application processor 101 executing voice recognition engine 205 executable code. The voice recognition engine enables the user of the mobile device 200 to train the voice recognition engine and to create the trained speech model 211 for specific command words or command phrases. As mentioned above, the voice recognition engine may be implemented by the application processor 101 executing the voice recognition engine 205 executable code. However, in some embodiments, a voice recognition engine may be implemented as a separate component such as a DSP, ASIC or some other processor etc. At the time the user creates the trained speech model 211 and sets up touchless control features, the user may also access the speech segment monitor 207. In some embodiments, the speech segment monitor 207 may be integrated with a voice recognition engine or may be a separate software component or hardware component as shown in FIG. 2. The speech segment monitor 207 may operate on the trained speech model 211 either as the trained speech model 211 is being generated by the user (such as during training), or subsequently by performing operations on the completed trained speech model 211 in a post-processing manner. Turning to FIG. 3, in operation block 301, the speech segment monitor 207 searches for and detects one or more pauses in one or more command phrases contained within the trained speech model 211 either during initial creation or during post-processing. In operation block 303, the speech segment monitor 207 will select a segment of a trained command phrase based on the location of at least one pause. The speech segment monitor 207 may detect that the command phrase contains a series of words as indicated by pauses in the speech pattern. For example, the user may create a command phrase specifically for waking up the application processor 101 from sleep mode. A command phrase such as "Okay, wake-up" may be used as was discussed in a previous example above. The speech segment monitor 207 may detect a pause between the first word "okay" and the second portion of the command phrase "wake-up". In operation block 305, the speech segment monitor 207 may store the segment (i.e. the word "okay") in a segment speech model 213. This operation of the speech segment monitor 207 may be repeated for any number of command phrases in order to create the segment speech model 213. Subsequently, as shown in operation block 307, the speech segment monitor 207 may use the segment speech model 213 (and the speech segments contained therein) as commands for implementing low-power control functions and features such as, but not limited to, a forced breath operation of the display 109. Alternatively, the basic speech model 209 may contain default command phrases that are used for various purposes. Therefore, in another example, the phrase "Okay wake up" may be a default command phrase for waking the application processor 101 (and therefore for waking the mobile device 200). In that case, the segment speech model 213 will include default speech command phrase segments that have been derived from the default command phrases of the basic speech model 209. Put another way, a "speech command phrase segment" is determined by identifying pauses within a command phrase where the pauses may define a word, one or more speech syllables, or other vocalization that may be subsequently recognized. A command phrase is a multiple word command that is recognizable by the voice recognition engine 205. The voice recognition engine 205 may be implemented as executable code stored in memory 117, and that is executed by the application processor 101. When the application processor 101 is placed into a sleep mode, the full functionality of the voice recognition engine 205 is not available and the speech segment monitor 207 takes over and provides certain features based on detection of speech command phrase segments. That is, the speech segment monitor 207 provides for various operations of the low-power processing 103, and control of other hardware, in response to voice, even though the application processor 101 is in a sleep mode such that the full features of the voice recognition engine 205 are not available. The voice recognition engine 205 becomes available again only in response to waking the application processor 101 which occurs in response to the user speaking a full command phrase for waking the mobile device 200.

One example of such a low power function or feature is the forced display breath as was described briefly above. FIG. 4 is a flowchart of an example method for performing a low power mode operation, such as a forced display breath, in accordance with an embodiment. That is, the flowchart of FIG. 4 is one possible example implementation of operation block 307 in the flowchart of FIG. 3. When the mobile device 200 is placed into a low power mode of operation such that the application processor 101 is in a sleep mode, the speech segment monitor 207 is activated. The speech segment monitor 207 then listens for command segments that match the segment speech model 213. In some embodiments, the segment speech model 213 may be stored in an on-board memory of the speech segment monitor 207. In operation block 401, the speech segment monitor 207 may detect a speech segment matching the segment speech model 213. As discussed above, the segment speech model 213 may be generated from the trained speech model 211 or may be derived from the basic speech model 209 and corresponding default command phrases. In that case, the segment speech model 213 need not be a trained speech model. That is, the speech command phrase segments of the segment speech model 213 may be derived from the basic speech model 209 such that they are not geared to any specific user speech pattern. In operation block 403, when the speech segment monitor 207 detects a speech command phrase segment, it sends a command to the display manager 215 which then controls the display hardware 107 to light the display 109 and thereby force a display breath. The forced display breath temporarily lights the display 109 to show the display data 221. An example of visual indications 901 that may appear on the display 109 are shown in FIG. 9A which was described briefly above. After a preset period of time, the display hardware 107 will again turn the display off as shown in operation block 405 and the method of operation then ends. The display hardware 107 may be controlled by the display manager 215 in order to turn off the display 109 after the preset period of time. The display manager 215 may determine the breath time period, and may send a command over the one or more connection buses 105 to command the display hardware 107 to turn the display 109 off after the duration of the forced breath. If the speech segment monitor 207 also detects that an entire speech command phrase has been spoken, such as a "wake-up" command phrase, then the speech segment monitor 207 will also send a command to the application processor 101, over the one or more connection buses 105, to wake the application processor 101 and thereby implement any subsequent command that may have been included in the command phrase.

Figure 9B:
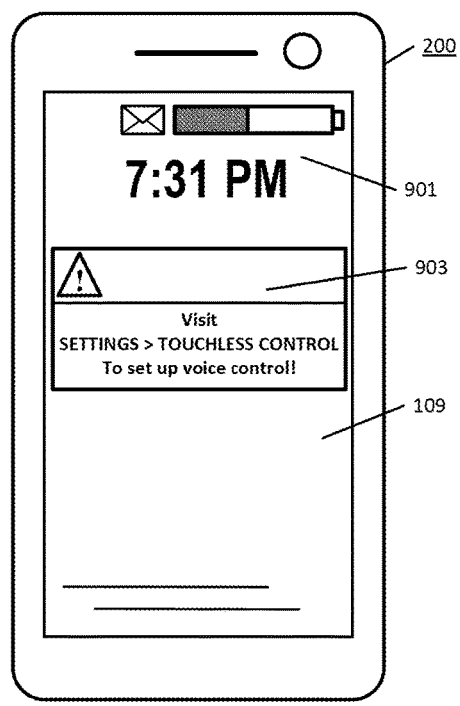
Figure 9C:
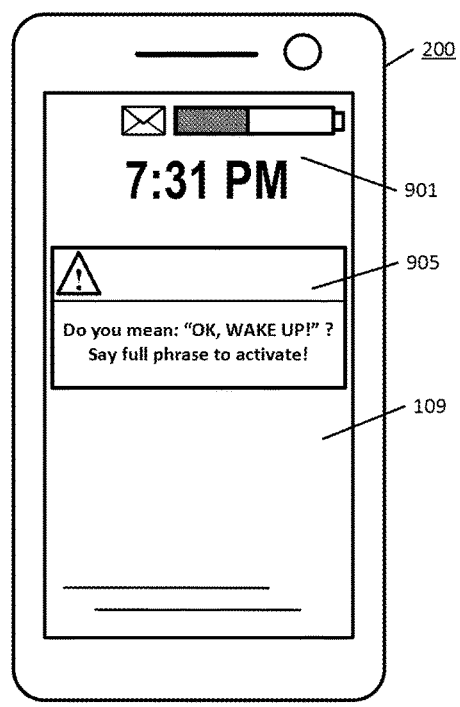

FIG. 5 is a flowchart of an example method for revealing help information to a user in accordance with an embodiment. In some instances, the speech segment monitor 207 may detect repeated uses of the same command segments within some predetermined or preset time interval. This may be due to any number of reasons one of which may be that the user is speaking too softly or that the audio environment is preventing the speech segment monitor 207 from accurately evaluating a spoken command phrase. Thus in operation block 501, if the same command segment is detected within a preset time interval, the speech segment monitor 207 may command the display manager 215 to force a display breath after updating the frame buffer 217 using a specific graphic object retrieved from the display graphics 223. As shown in operation block 503, after the time interval is expired, the display manager 215 may cause a forced display breath and may also provide a user prompt with help information. More particularly, the user prompt is a graphic object (i.e. a graphic image) that has been predetermined and is stored in the display graphics 223. The display manager 215 overwrites a portion of the frame buffer 217 using the predetermined graphic object. The speech segment monitor 207 sends an identifier for the predetermined graphic object to the display manager 215 along with the command, in response to detecting multiple occurrences of the same speech command phrase segment within a predetermined time period (such as, for example, within 10 or 20 seconds). Examples of predetermined graphic objects that may be displayed to the user are illustrated in FIG. 9B and FIG. 9C. In FIG. 9B, if the user has not set up any specific voice control parameters (i.e. has not set up touchless control) and has not generated the trained speech model 211, a message box 903 may be displayed that informs the user of the menu selections required to set up touchless control. In one embodiment, the message box 903 is a pre-created graphic object that is stored as a display graphic in display graphics 223. That is, the display manager 215 may retrieve the message box 903 graphic object data from display graphics 223, and update a section of the frame buffer 213 in order to revise the display data 221 such that the forced breath will include the message box 903 on the display 109. In another example, if the user repeatedly speaks a segment of an existing command phrase, a message box 905 may be displayed that asks the user whether they meant to speak the full command phrase or not and that provides the full command phrase text to the user. In other words, the message box 905 may serve as a reminder of what the full command phrase is in the event that the user had forgotten. The message box 905 may also be used to request that the user speak louder or provide some other helpful information. The message box 905 may also be a display graphic object stored in display graphics 223 and that is used to update the frame buffer 217. As shown in FIG. 9B and FIG. 9C, the message box 903 or message box 905 will be displayed along with the visual indications 901 during the forced breath. In operation block 505, the display is turned off once again and the method of operation ends.

Figure 6:
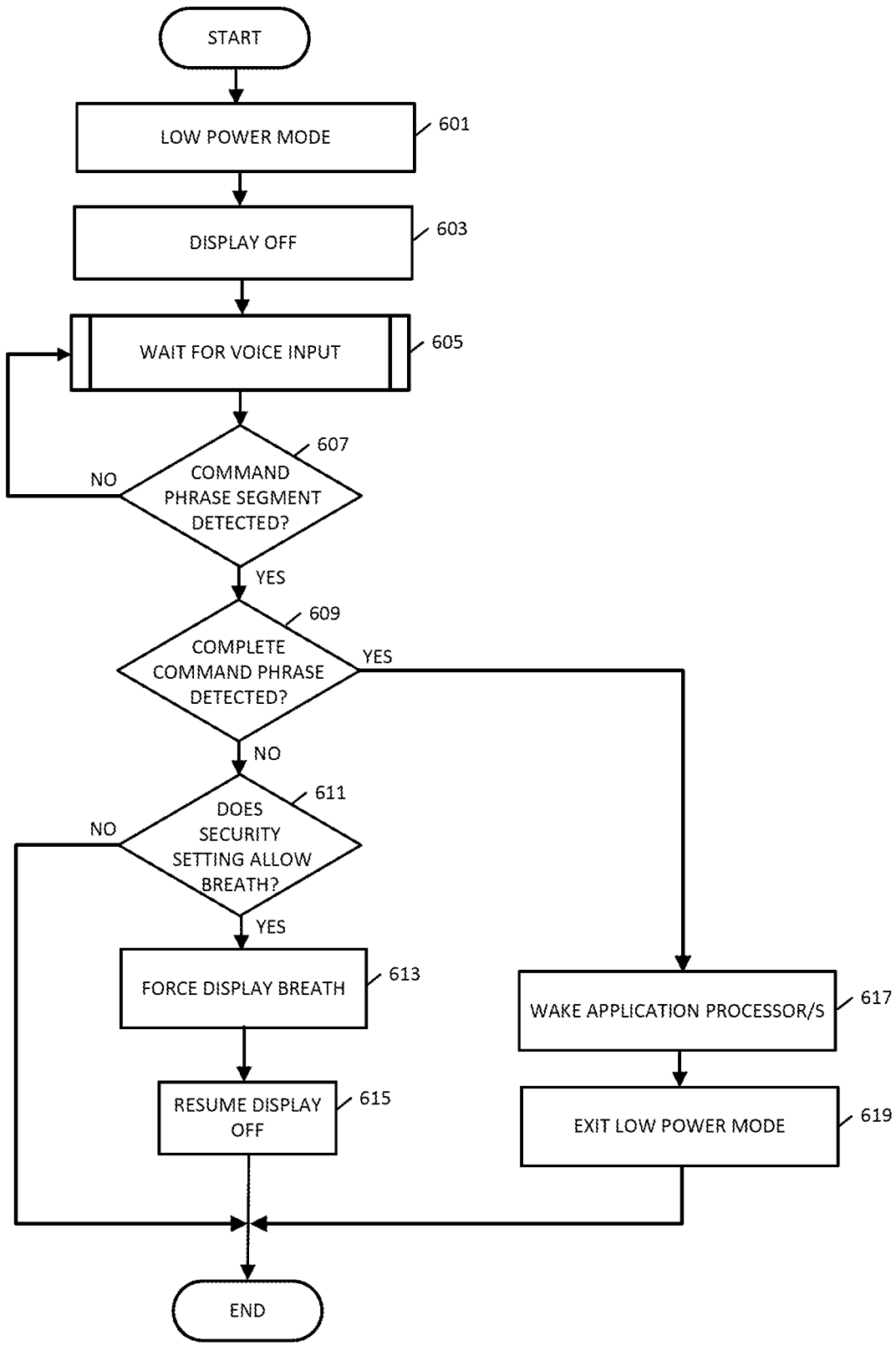
FIG. 6 is a flowchart of an example method for performing a forced breath operation on a display in accordance with an embodiment.

FIG. 6 is a flowchart of an example method for performing a forced breath operation on a display in accordance with an embodiment. The method of FIG. 6 begins when the mobile device 200, and therefore the application processor 101, is operating in a low-power mode as shown in operation block 601. The display 109 is therefore turned off as shown in operation block 603. The speech segment monitor 207 then waits for voice input in operation block 605. If a speech command phrase segment is detected in decision block 607, then the speech segment monitor 207 will command the display manager 215 to proceed to force a display breath in operation block 613. Security settings (or other settings) may prevent the forced breath from occurring and therefore these settings are checked as shown in decision block 611. If the security settings or other settings do not allow for forced breathing to occur, the method of operation then ends. The security settings may be stored in the memory 117 in some embodiments. If no speech command phrase segment is detected in decision block 607, then the speech segment monitor 207 continues to wait for voice input as shown in operation block 605.

In addition to listening for command phrase segments in decision block 607, the speech segment monitor 207 also listens for a complete wake-up command phrase as shown in decision block 609. If a wake-up command phrase is detected, then the speech segment monitor 207 sends a wake-up command to the application processor 101 and also passes any speech commands detected after the wake-up phrase to the application processor 101. The application processor 101 then handles any other spoken commands that were subsequent to the wake-up command phrase. If a complete command phrase was not detected in decision block 609, but a command phrase segment was detected in decision block 607, then the speech segment monitor 207 commands the display manager 215 to proceed to force the display breath in operation block 613 in response to detection of the command phrase segment in decision block 607. The display is again turned off in operation block 615, the application processor 101 remains in a sleep state, and the method of operation ends. However if a complete command phrase was also detected in decision block 609, then the speech segment monitor 207 will send a command to the application processor 101 to wake the application processor 101 as shown in operation block 617. The mobile device 200 therefore exits low-power mode as shown in operation block 619 and the method of operation then ends.

Thus for example, if the display is off and the user begins to speak a trigger phrase such as, "Okay wake up", the speech segment monitor 207 will command the display manager 215 to immediately force a breath as soon as the "Okay" command phrase segment is detected. Among other advantages, the mobile device 200 will thereby appear extremely responsive by lighting up and showing a "sign of life" even as the trigger phrase is spoken, and before the mobile device 200 has even decided that it needs to wake up the application processor 101 fully. As mentioned above, the "Okay" command phrase segment is not part of the trained trigger (i.e. it is not part of the complete trained command phrase) and may not be part of the trained speech model 213.

The method of operation of FIG. 6 may thus be considered as detecting a "compound trigger" such as for example, "Okay wake up" where the "Okay" segment wakes up the display 109 (i.e. results in a forced display breath), and the complete trigger wakes up the application processor 101. Thus if the display 109 is off and the user speaks "Okay" (in this example), the speech segment monitor 207 and display manager 215 will force a breath to occur, even if the "Okay" command phrase segment is not followed by the rest of the phrase or a command. The user can therefore force a display breath at any time, as long as they are in listening range, simply by saying the command phrase segment "Okay" (or some other command phrase segment in other examples). If the display 109 is already on, then any such command phrase segment will be ignored. Because the command phrase segment utilized (such as "Okay" in the example above) may not be part of the trained speech model 211, any user (not just the primary user that has gone through the setup process for touchless control and created a trained speech model 211) will be able to speak the command phrase segment, such as "Okay", and force a display breath to occur, provided that the current mobile device 200 security settings or other settings allow for breathing to occur at that time.

Figure 7:
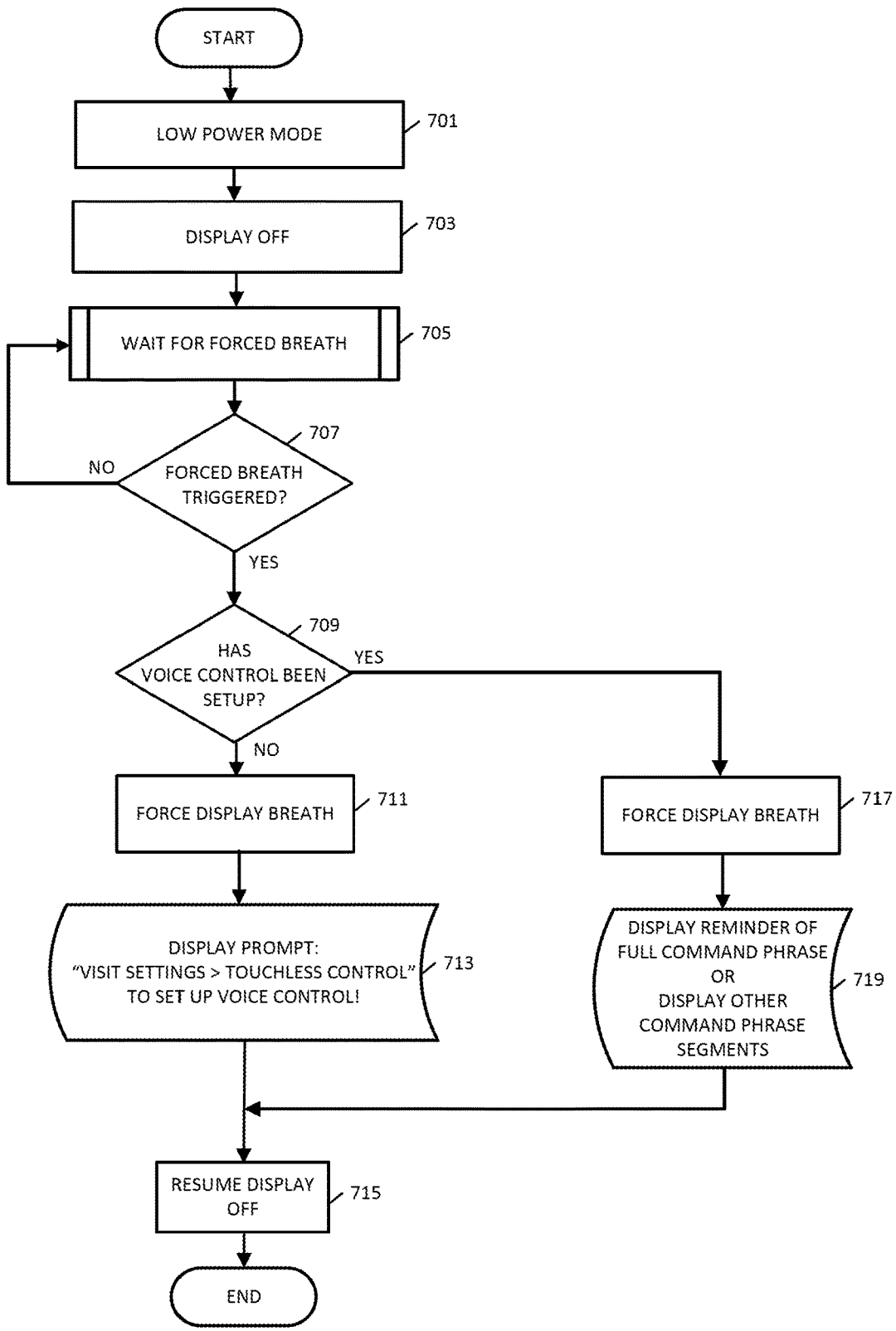
FIG. 7 is a flowchart of an example method for displaying information to a user in accordance with an embodiment.

FIG. 7 is a flowchart of an example method for displaying information to a user in accordance with an embodiment. The application processor 101 is in a sleep mode of operation as shown in operation block 701 and the display 109 is turned off as shown in operation block 703. The display manager 215 waits for a forced breath command in operation block 705. If a forced breath is triggered as shown in decision block 707, then the low-power processing 103 may check user settings to determine whether the user has set up voice control as shown in decision block 709. If a forced breath trigger is not detected in decision block 707, then the display manager 215 continues to wait for a forced breath command to occur in operation block 705.

If voice control has been set up by the user in decision block 709 then, in operation block 719, the display manager 215 may display a reminder of the full command phrase during the forced breath that occurs in operation block 717, or may retrieve a graphic object showing some other available command phrase or command phrase segments that the user may employ. One example of information that may be displayed is shown FIG. 9C as message box 905. The display 109 will then be turned off again as shown in operation block 715 and the method of operation ends.

If voice control has not been set up in decision block 709, the display manager 215 will force a display breath as shown in operation block 711. The display manager 215 will retrieve the graphic object image data for message box 903, or a similar message box, from the display graphics 223 and overwrite a section of the frame buffer 217 to display it on the display 109 as shown in operation block 713. An example of what may be shown on a mobile device display during execution of operation block 711 and operation block 713 is shown in FIG. 9B. That is, the message box 903 may provide a prompt to the user informing the user of the appropriate menu selections required to set up voice control. After the breathing time interval has expired the display will be turned off once again in operation block 715 and the method of operation then ends.

Figure 8:
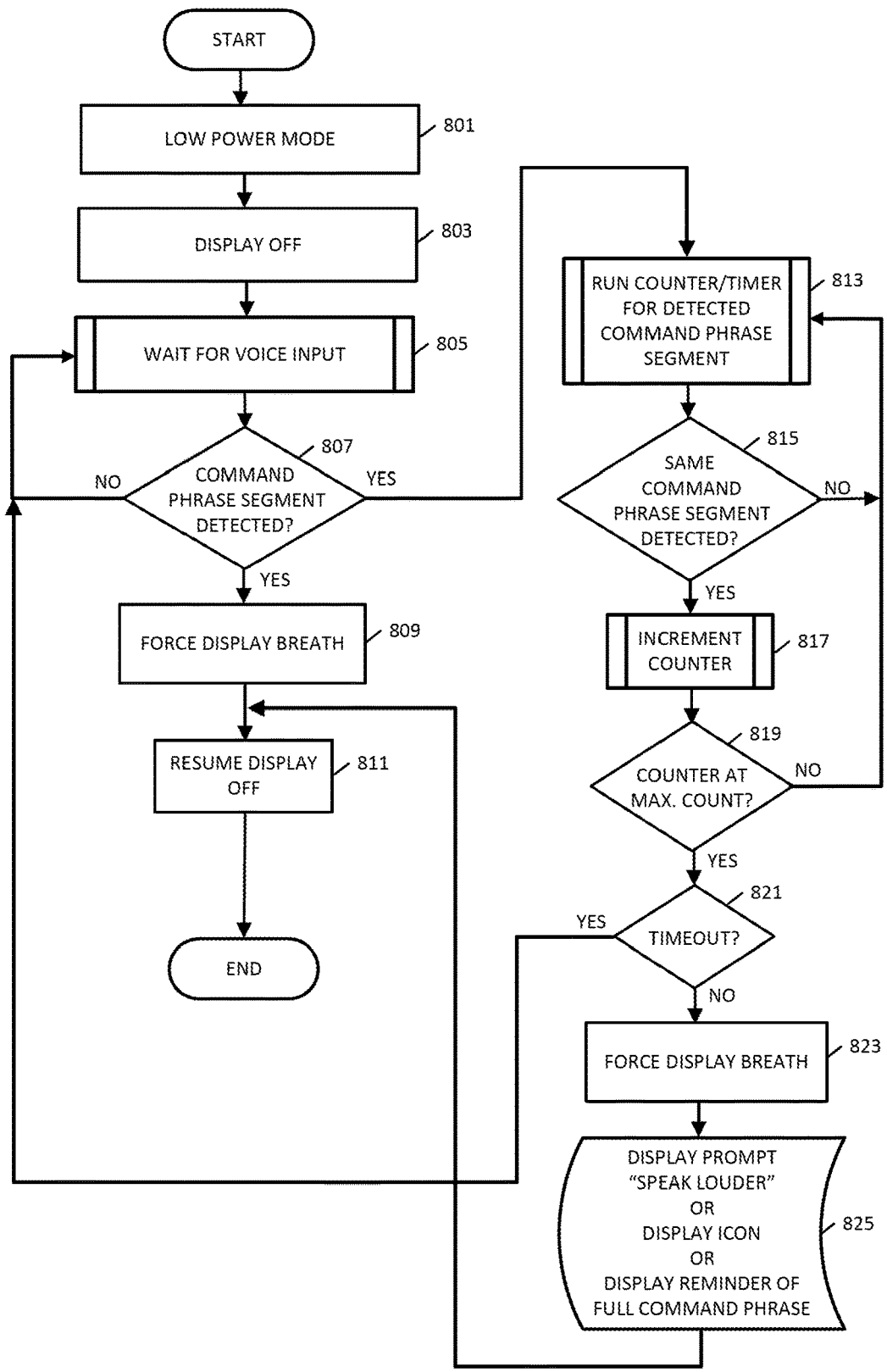
FIG. 8 is a flowchart of an example method for prompting a user for a voice command in accordance with an embodiment.

FIG. 8 is a flowchart of an example method for prompting a user for a voice command in accordance with an embodiment. The various embodiments enable provision of user "help" text (as a pre-created graphic object) that may be used to instruct a user to speak louder, remind the user of what their full trigger phrase is, or expose additional one-shot commands. The application processor 101 is in a sleep mode of operation as shown in operation block 801 and the display 109 is turned off as shown in operation block 803. The speech segment monitor 207 waits for voice input in operation block 805. If a command phrase segment is detected in decision block 807, then the display manager 215 will force a display breath in operation block 809 and will turn the display off again in operation block 811. The method of operation will then end. The speech segment monitor 207 continues to wait for voice input in operation block 805 until a command phrase is detected in decision block 807.

In addition to forcing the display breath in operation block 809, upon detection of a command phrase segment in decision block 807, the speech segment monitor 207 will also begin a counter and timer operation associated with the detected command phrase segment. This is illustrated in operation block 813 and continues until a preset number of identical command phrase segments are detected in decision block 815. If the same command phrase segment is detected in decision block 815, the counter is incremented as shown in operation block 817. The counter is incremented until the counter reaches a predetermined maximum count in decision block 819. If the counter reaches a predetermined maximum count (such as for example three attempts), then the speech segment monitor 207 determines whether the timer has timed out in decision block 821. If the timer has timed out in decision block 821, then the speech segment monitor 207 will continue to wait for voice input in operation block 805.

However if the timer has not timed out in decision block 821, such that the user has attempted a predetermined maximum amount of command phrase segment attempts within the preset time interval (for example 3 attempts within 20 seconds), then the speech segment monitor 207 will command the display manager 215 to force a display breath in operation block 823. The display manager 215 will retrieve an appropriate display graphic object from the display graphics 223 and update the frame buffer 217 accordingly by overwriting a section. The retrieved display graphic object will revise the display data 221 to display a prompt to "speak louder", to display an icon, or to remind the user of the full command phrase associated with the command phrase segment. This operation occurs in operation block 825, an example of which is illustrated by message box 905 in FIG. 9C. The display manager 215 will then turn the display off after the forced breath time interval as shown in operation block 811 and the method of operation then ends.

Figure 9D:
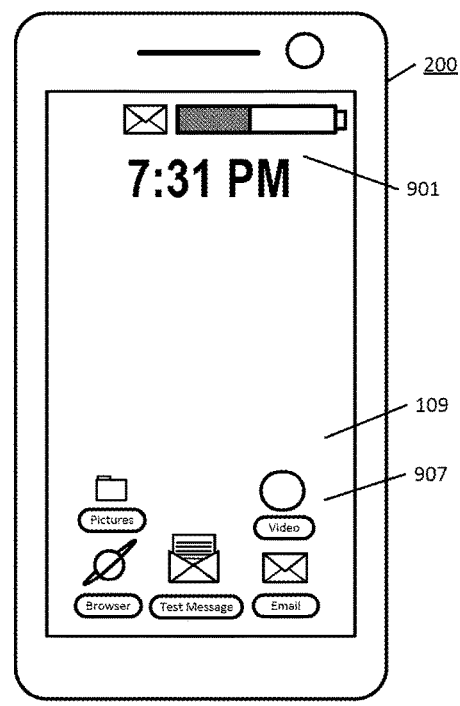

Any appropriate information may be displayed to the user in accordance with the method of operation of FIG. 8. For example, various icons 907 may be displayed to the user as shown in the example of FIG. 9D. These icons 907 may also be stored in the display graphics 223 and used by the display manager 215 to update the frame buffer 217 and thereby revise the display data 221 for display during the forced breath operation.

Figure 10:
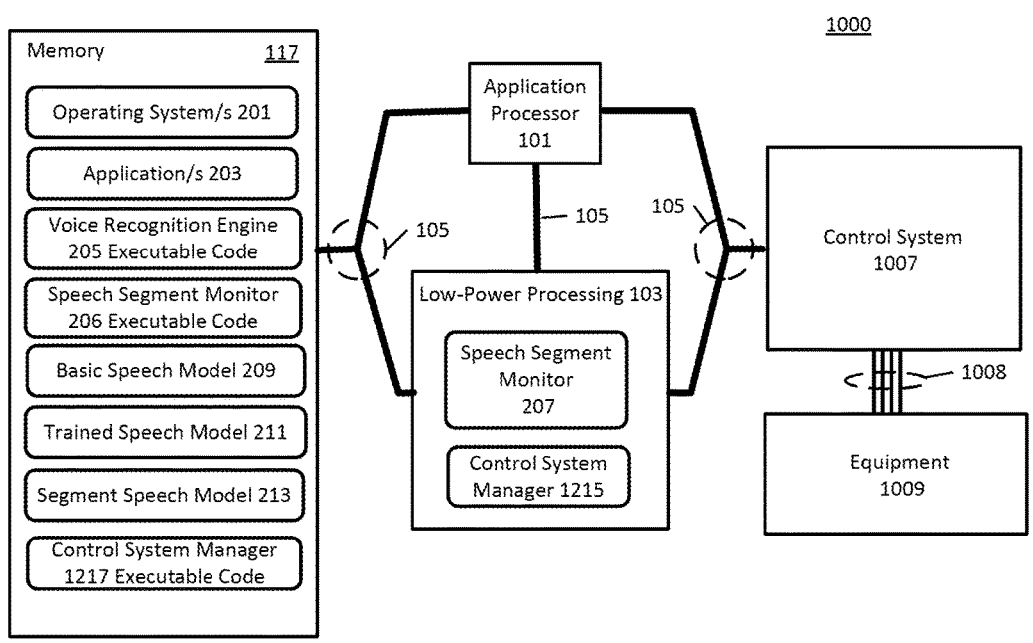
FIG. 10 is a block diagram of an example control system in accordance with an embodiment.

Therefore, among other advantages, the utilization of command phrase segments contained within the segment speech model 213 enable functionality and features that may be accessed during the low-power mode of operation of the mobile device 200, and to reveal these features to the user in a progressive manner based on detection of the various command phrase segments or by detection of repeated usage of the same command phrase segments within predetermined time intervals. The mobile device 200 may include various settings such that a command phrase segment (user defined or default) that is used to force a breath on the display 109 may either be ON or OFF by default and may be changed by the user. Although the examples provided above were related to forcing a breath on the display 109 during a low-power operating mode, other features of functions may also be implemented using the inventive concepts herein described. In other words, any function that may be performed while a device is in a low-power operating mode may benefit from the embodiments herein described as may occur to those skilled in the art. Any of various control systems may benefit from the features and functions described herein. One example application is in robotic control systems, where sleep mode is used to conserve power. Voice control segments may be used in low power mode to implement functions without waking the main processor of the control system. Thus, small servo-motors may be operated in low-power mode to move or reposition robotic equipment slightly without waking and invoking the full processing power of the robotic control system. Other applications will become apparent to those of ordinary skill in light of the examples and description provided herein. FIG. 10 provides an example apparatus which is a robotic control system 1000 using the features of voice control described herein. The speech segment monitor 207 is operative to provide commands to control system manager 1215 and further to control system 1007 which is operatively coupled to controllable equipment 1009 by a control bus 1008. The speech segment monitor 207 is operative to perform various low-power operations on the equipment 1009 while the application processor 101 is in sleep mode. For example, in some embodiments, the equipment 1009 may include robotic machinery that may be moved slightly using low-power servo motors in response to speech command segments detected by the speech segment monitor 207. The control system manager 1215 sends appropriate signals over the one or more connection buses 105 to the control system 1007, to operate the equipment 1009, in response to various speech segments detected by the speech segment monitor 207 that match the segment speech model 213. In some embodiments, a control system manager may be implemented by executing control system manager 1217 executable code stored in memory 117, where at least one processor of low-power processing 103 is operative to execute the executable code to perform the features and operations of the control system manager.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A computer-implemented method comprising:
during operation of a mobile device in an awake mode providing full functionality of a voice recognition system of the mobile device:
   determining, by data processing hardware of the mobile device, to operate the mobile device in a low-power mode;
   in response to determining to operate the mobile device in the low-power mode and before entering the low-power mode, storing, in a frame buffer of the mobile device, a graphical user interface; and
   operating, by the data processing hardware, the mobile device in the low-power mode by turning off a display of the mobile device and reducing the functionality of the voice recognition system of the mobile device; and
during operation of the mobile device in the low-power mode in which functionality of the voice recognition engine of the mobile device is reduced:
   receiving, at the data processing hardware, an utterance of at least an initial portion of a predetermined command phrase, the predetermined command phrase comprising a series of multiple words configured to cause the mobile device to wake-up from the low-power mode in response to detecting each word of the series of multiple words in the utterance;
   detecting, by the data processing hardware, the initial portion of the predetermined command phrase in the utterance; and
   in response to detecting the initial portion of the predetermined command phrase in the utterance:
      determining, by the data processing hardware, whether a remaining portion of the predetermined command phrase is detected in the utterance within a first predetermined period of time after detecting the initial portion of the predetermined command phrase in the utterance;
      turning on, by the data processing hardware, the display of the mobile device; and
      displaying, by the data processing hardware for output on the display, at least a portion of the graphical user interface that was stored in the frame buffer before the mobile device entered the low-power mode.

2. The method of claim 1, further comprising, when the remaining portion of the predetermined command phrase is not detected in the utterance within the first predetermined period of time, automatically deactivating, by the data processing hardware, the display of the mobile device a second predetermined period of time after displaying the at least the portion of the graphical user interface for output on the display.

3. The method of claim 1, wherein the low-power mode maintains applications running on the mobile device in an inactive state.

4. The method of claim 2, further comprising, after deactivating the display:
receiving, at the data processing hardware, an additional utterance of the initial portion of the predetermined command phrase; and
in response to receiving the additional utterance of the initial portion of the predetermined command phrase:
   turning on, by the data processing hardware, the display of the mobile device; and
   displaying, by the data processing hardware for output on the display, the at least the portion of the graphical user interface that was stored in the frame buffer before the mobile device entered the low-power mode.

5. The method of claim 1, wherein the graphical user interface stored in the frame buffer includes a user-selected background, a current time, and a battery level indicator.

6. The method of claim 5, further comprising:
determining, by the data processing hardware, that an amount of power remaining in a battery of the mobile device is below a predetermined power level,
wherein the battery level indicator of the graphical user interface indicates that the amount of power remaining in the battery of the mobile device is below the predetermined power level.

7. A system comprising:
one or more computers of a mobile device and one or more storage devices of the mobile device storing instructions that are operable, when executed by the one or more computers, to cause the one or more computers to perform operations comprising:

during operation of the mobile device in an awake mode providing full functionality of a voice recognition system of the mobile device:
　determining to operate the mobile device in a low-power mode;
　in response to determining to operate the mobile device in the low-power mode and before entering the low-power mode, storing, in a frame buffer of the mobile device, a graphical user interface; and
　operating the mobile device in the low-power mode by turning off a display of the mobile device and reducing the functionality of the voice recognition system of the mobile device; and during operation of the mobile device in the low-power mode in which functionality of the voice recognition engine of the mobile device is reduced:
　receiving an utterance of at least an initial portion of a predetermined command phrase, the predetermined command phrase comprising a series of multiple words configured to cause the mobile device to wake-up from the low-power mode in response to detecting each word of the series of multiple words in the utterance;
　detecting the initial portion of the predetermined command phrase in the utterance; and
　in response to detecting the initial portion of the predetermined command phrase in the utterance:
　　determining, by the data processing hardware, whether a remaining portion of the predetermined command phrase is detected in the utterance within a first predetermined period of time after detecting the initial portion of the predetermined command phrase in the utterance;
　　turning on the display of the mobile device; and
　　displaying, for output on the display, at least a portion of the graphical user interface that was stored in the frame buffer before the mobile device entered the low-power mode.

8. The system of claim 7, wherein the operations further comprise, when the remaining portion of the predetermined command phrase is not detected in the utterance within the first predetermined period of time, automatically deactivating the display of the mobile device a second predetermined period of time after displaying the at least the portion of the graphical user interface for output on the display.

9. The system of claim 7, wherein the low-power mode maintains applications running on the mobile device in an inactive state.

10. The system of claim 7, wherein the operations further comprise, after deactivating the display:
　receiving an additional utterance of the initial portion of the predetermined command phrase; and
　in response to receiving the additional utterance of the initial portion of the predetermined command phrase:
　　turning on the display of the mobile device; and
　　displaying, for output on the display, the at least the portion of the graphical user interface that was stored in the frame buffer before the mobile device entered the low-power mode.

11. The system of claim 7, wherein the graphical user interface stored in the frame buffer includes a user-selected background, a current time, and a battery level indicator.

12. The system of claim 11, wherein the operations further comprise:
　determining that an amount of power remaining in a battery of the mobile device is below a predetermined power level,
　wherein the battery level indicator of the graphical user interface indicates that the amount of power remaining in the battery of the mobile device is below the predetermined power level.

13. A non-transitory computer-readable medium storing software comprising instructions executable by one or more computers which, upon such execution, cause the one or more computers to perform operations comprising:
during operation of a mobile device in an awake mode providing full functionality of a voice recognition system of the mobile device:
　determining to operate the mobile device in a low-power mode;
　in response to determining to operate the mobile device in the low-power mode and before entering the low-power mode, storing, in a frame buffer of the mobile device, a graphical user interface; and
　operating the mobile device in the low-power mode by turning off a display of the mobile device and reducing the functionality of the voice recognition system of the mobile device; and during operation of the mobile device in the low-power mode in which functionality of the voice recognition engine of the mobile device is reduced:
　receiving an utterance of at least an initial portion of a predetermined command phrase, the predetermined command phrase comprising a series of multiple words configured to cause the mobile device to wake-up from the low-power mode in response to detecting each word of the series of multiple words in the utterance;
　detecting the initial portion of the predetermined command phrase in the utterance; and
　in response to detecting the initial portion of the predetermined command phrase in the utterance:
　　determining, by the data processing hardware, whether a remaining portion of the predetermined command phrase is detected in the utterance within a first predetermined period of time after detecting the initial portion of the predetermined command phrase in the utterance;
　　turning on the display of the mobile device; and
　　displaying, for output on the display, at least a portion of the graphical user interface that was stored in the frame buffer before the mobile device entered the low-power mode.

14. The non-transitory computer-readable medium of claim 13, wherein the operations further comprise, when the remaining portion of the predetermined command phrase is not detected in the utterance within the first predetermined period of time, automatically deactivating the display of the mobile device a second predetermined period of time after displaying the at least the portion of the graphical user interface for output on the display.

15. The non-transitory computer-readable medium of claim 13, wherein the low-power mode maintains applications running on the mobile device in an inactive state.

16. The non-transitory computer-readable medium of claim 13, wherein the operations further comprise, after deactivating the display:
　receiving an additional utterance of the initial portion of the predetermined command phrase; and
　in response to receiving the additional utterance of the initial portion of the predetermined command phrase:
　　turning on the display of the mobile device; and displaying, for output on the display, the at least the portion of the graphical user interface that was stored in the frame buffer before the mobile device entered the low-power mode.

17. The non-transitory computer-readable medium of claim 13, wherein the graphical user interface stored in the frame buffer includes a user-selected background, a current time, and a battery level indicator.

18. The non-transitory computer-readable of claim 13, wherein the operations further comprise:
   determining that an amount of power remaining in a battery of the mobile device is below a predetermined power level,
   wherein the battery level indicator of the graphical user interface indicates that the amount of power remaining in the battery of the mobile device is below the predetermined power level.

\* \* \* \* \*